June 21, 1966   A. A. KLEBBA   3,257,555

PATTERN SCANNING SYSTEM

Filed Oct. 14, 1963   2 Sheets-Sheet 1

INVENTOR
ARTHUR A. KLEBBA
BY Roger A. Van Kirk
ATTORNEY

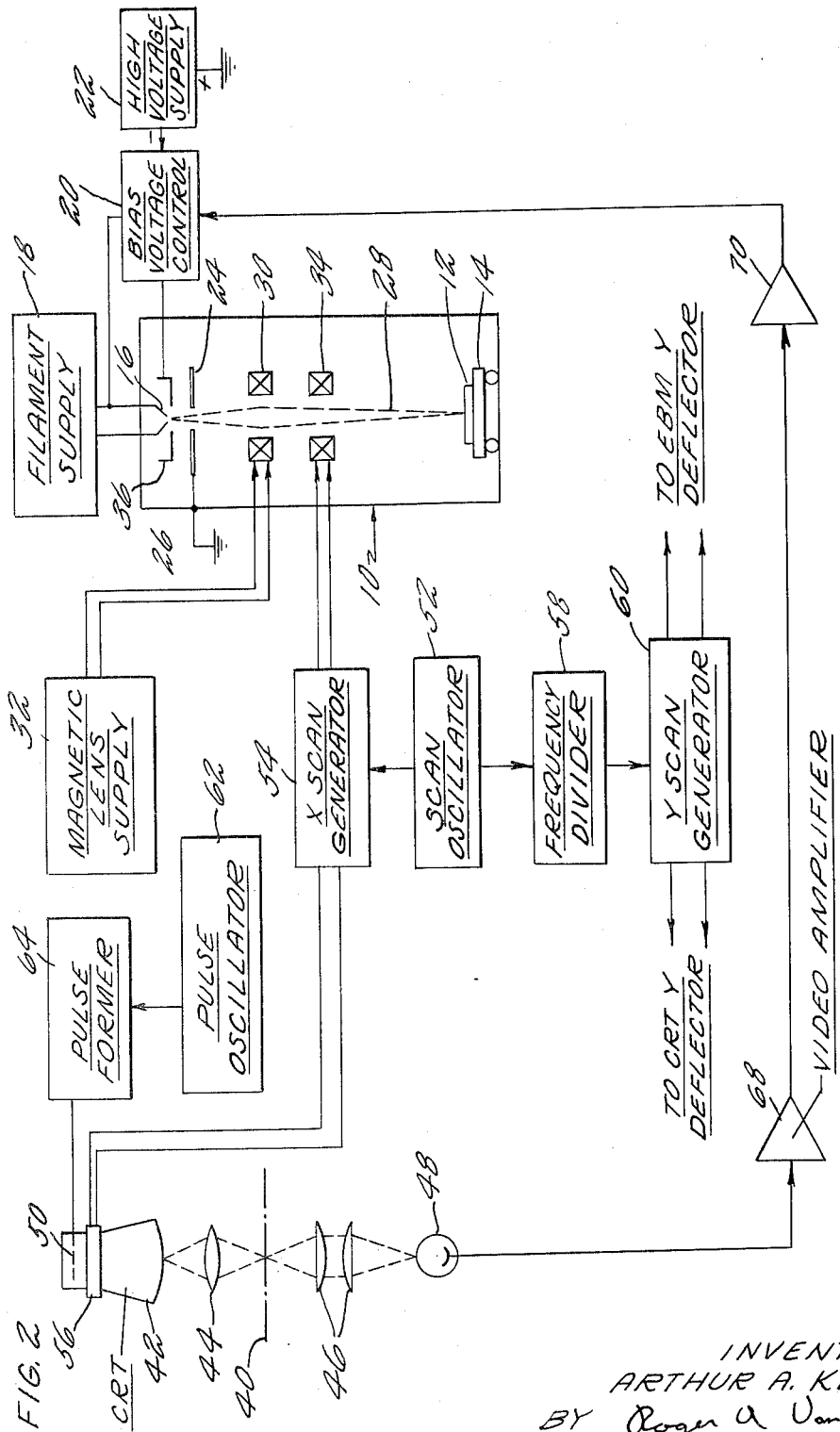

United States Patent Office

3,257,555
Patented June 21, 1966

3,257,555
PATTERN SCANNING SYSTEM
Arthur A. Klebba, Thompsonville, Conn., assignor to United Aircraft Corporation, East Hartford, Conn., a corporation of Delaware
Filed Oct. 14, 1963, Ser. No. 316,024
5 Claims. (Cl. 250—49.5)

This invention relates to an improved method and apparatus for the machining of material with an energized beam. More particularly, this invention is directed to causing an intense beam of charged particles to automatically trace a design carried by a remotely located pattern mask while performing a desired operation on a workpiece.

While not limited thereto, this invention is particularly applicable to electron beam machining or welding. Electron beam machines, as they are generally known, are devices which use the kinetic energy of an electron beam to work a material. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. This temperature increase is so great that, depending on the beam power density, all or a portion of the material at the beam impingement point will be vaporized. In other words, in accordance with the selected beam power density, either a welding or machining operation may be performed.

To be commercially practical, an electron beam machine must be adapted to perform the desired operation on the workpiece rapidly, accurately and automatically. The logical manner in which to accompuish this necessary automation is to provide for programmed relative movement between the electron beam and the workpiece. In order to realize this relative movement by programmed deflection of the beam, certain requirements must be met. For example, steps must be taken to trigger the working beam only in spots where the pattern is to be cut, machined or a weld made and to insure that the beam will be cut off while being deflected to these spots. Also, means must be provided to insure tracing the entire pattern. This presents a problem since, in the vaporization of material by an electron beam, the intense heat produced in one localized area must be permitted to dissipate before an adjacent localized area can be worked to prevent melting and secure sharply defined machining. That is, two points adjacent in space should not be worked successively in time. Furthermore, there is the consideration that heating of the entire workpiece should be kept uniform to avoid local distortion due to uneven heating.

In U.S. Patent No. 2,989,614, issued June 20, 1961, to K. H. Steigerwald, there is disclosed a method of working material in which an intermittently acting beam of charged particles, the working cross section of which is smaller than the surface of the material to be worked, passes over the workpiece. In the method disclosed in this patent, the beam of charged particles is moved in a predetermined manner and jumps over the workpiece so that surface areas which are worked immediately after one another are separated by distance which is greater than the diameter of such a worked area. Consequently, the entire area worked will finally be composed completely of a large number of adjoining worked surface areas.

The prior art method of working materials with a beam of charged particles explained in Patent No. 2,989,614 is universally applicable and can be adapted to all conditions. However, the disclosed apparatus for carrying out this method is very expensive since it requires a digital computer or the equivalent thereof for programming the deflection of the beam. As will be obvious to those skilled in the art, such apparatus is not only extremely expensive but is also susceptible to failure due to its complexity.

This invention solves the above-mentioned problems and accomplishes the programming of an energized beam through novel, reliable apparatus which causes such a beam to be deflected over the surface of a workpiece in accordance with a prepared pattern remotely located with respect to the beam generator.

It is, therefore, an object of this invention to program the deflection of an energized beam.

It is another object of this invention to cause an energized beam to trace a pattern.

It is still another object of this invention to perform the desired operation on a workpiece with an energized beam rapidly, accurately and automatically.

It is yet another object of this invention to provide automatic control for an electron beam machine.

It is also an object of this invention to generate deflection control voltages for a device which utilizes a beam of charged particles to work materials.

It is similarly an object of this invention to trace a pattern with a beam of charged particles by causing the beam to serially trace portions of the pattern.

It is likewise an object of this invention to provide a method of working a material with a beam of charged particles which requires a more reliable and substantially less expensive device than previously available.

These and other objects of this invention are accomplished by novel apparatus which scans a pattern, senses the location of indicia on the pattern and generates from the indicia thus scanned beam control signals which are applied to the deflection and beam gating circuits of a device which produces an enerigzed beam. The aforesaid novel apparatus is comprised of a control system in which a pattern is scanned and reproduced by continuous progression or retrogression of sampling points thereon. The scanning and sampling means are coupled to and thus control the beam generator. In this manner, the entire pattern is repeatedly scanned until the complete pattern has been reproduced by the beam.

This invention may be better understood and its numerous advantages will become apparent to those skilled in the art by reference to the accompanying drawing in which like reference numerals apply to like elements in the various figures and in which:

FIGURE 2 is a block diagram of a second embodiment of the novel apparatus which comprises this invention.

Figure 1:
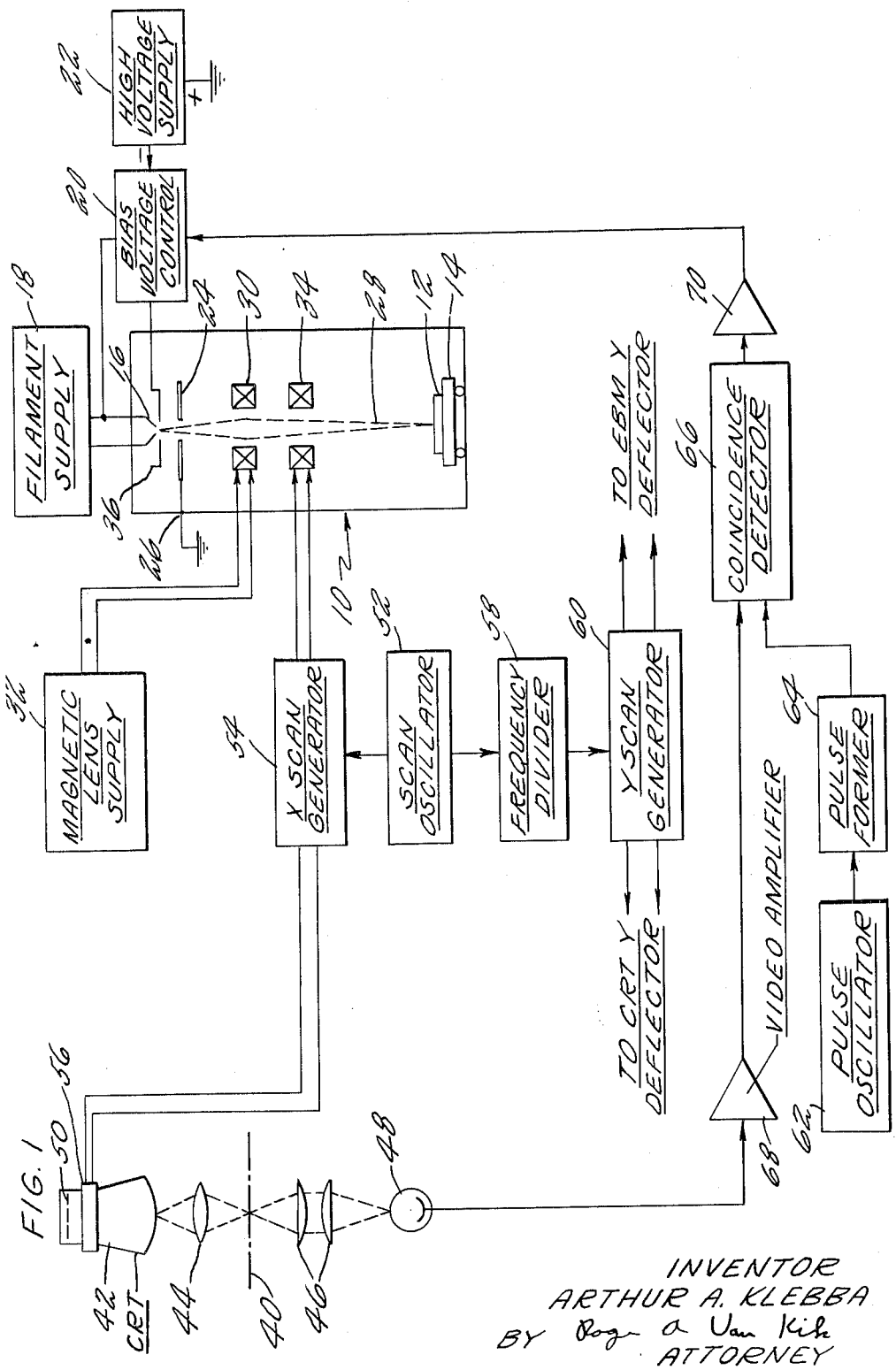
FIGURE 1 is a block diagram of a first embodiment of the novel apparatus which comprises this invention.

Referring now more particularly to FIGURE 1, an electron beam machine is indicated generally at 10. The machine comprises an evacuated envelope in which a workpiece 12, the two dimensional surface area of which is to be machined, is placed on a movable table 14. The machine also comprises an electron beam column containing a source of electrons, beam forming and beam focusing means. The source of electrons comprises a directly heated cathode or filament 16 which is supplied with heating current from a filament current supply 18. Cathode 16 also has applied thereto, through a bias control 20, a negative acceleration voltage from high voltage supply 22. An apertured anode 24 is positioned in the electron beam column between cathode 16 and workpiece 12. The anode is connected to the case of the machine which is grounded at 26. The difference in potential between cathode 16 and anode 24 causes the electrons emitted from the cathode to be accelerated toward the workpiece. The electrons are focused into a beam indicated generally as 28 by an electron optical system comprising in part a magnetic lens assembly 30 which is supplied with focusing current from lens current supply 32.

When gated on, the beam impinges on workpiece 12 where it gives up kinetic energy in the form of heat. As will be explained more fully below, beam 28 may be deflected over the surface of the workpiece by means of varying the current supplied to deflection coils 34. Positioned adjacent cathode 16 is a control electrode 36. This control electrode is normally maintained at a voltage which is more negative than the voltage applied to the cathode. The magnitude of this bias or voltage difference is such that the machine is normally cut off. When it is desired to impinge the beam on workpiece 12, the blocking bias voltage is removed or reduced by applying a control signal to bias voltage control 20. Control 20 may be of the type described in copending application Serial No. 214,313, filed August 2, 1962, by John A. Hansen, now U.S. Patent No. 3,177,434, issued April 6, 1965, and assigned to the same assignee as the present invention.

A pattern mask containing a pattern that it is desired to have the beam 28 of machine 10 cut or machine on workpiece 12 is indicated at 40. In operation, the pattern mask 40 wil be positioned as shown so as to be repeatedly scanned by a beam of light emanating from a flying spot scanner. In the usual case, the pattern will appear as light lines on a photograph negative. As the flying spot scans the screen of cathode ray tube 42, there is provided a moving point source of light. The spot on the face of tube 42 is focused by objective lens 44 into a real image which appears in the plane of pattern or negative 40 which, as mentioned above, has various opaque and transparent areas. The spot image in the plane of pattern 40 is focused by a condenser assembly, comprising a pair of spaced planoconvex lenses 46, onto the surface of a phototube 48. Each time a light line on the pattern or negative is crossed or intercepted by the flying spot, a pulse of light will appear to emanate from the negative. These pulses of light are connected into electrical signals by phototube 48.

Both the electron beam machine 10 and cathode ray tube 42 are provided with x and y axis deflection inputs and with control grid or intensity inputs. As mentioned above, the intensity input to the electron beam machine is applied to control electrode 36 via bias control 20. The intensity input to cathode ray tube 42 is applied to a control grid 50 in the gun assembly thereof. The $x$ and $y$ deflection voltages for the flying spot scanner and electron beam machine are generated in a conventional manner. A scan oscillator 52 generates a series of pulses at the desired frequency which are applied to a horizontal scan generator 54. Generator 54 may be any well known type of saw-tooth wave generator the output of which, when applied to a first pair of diametrically opposed deflection coils 34 in electron beam machine 10 and to a similar pair of coils in the deflection yoke 56 of cathode ray tube 42, will lineally deflect the spot across the screen of the cathode ray tube in the $x$ direction and simultaneously generate a deflection voltage which would cause the electron beam, if energized, to track or follow the movement of the flying spot. As is common practice, the output of scan oscillator 52 is also applied to a frequency divider 58 and thence to a vertical scan generator 60. The output of vertical scan generator 60, which also may be any well-known type of saw-tooth oscillator, is also a saw-tooth deflection voltage whose frequency is much lower than the output of scan generator 54. This low frequency saw-tooth voltage is applied to $y$ axis deflection coils in machine 10 and yoke 56 of tube 42.

In order to achieve continuous progression or retrogression of the sampling the pattern on mask 40, it is necessary to either modulate the cathode ray tube 42 so that there is a source of pattern scanning light at different points in time during successive cycles of the sweep voltages from generators 54 and 60 or to similarly modulate the output from phototube 48. Thus, for the purpose of sampling, a pulse oscillator 62 is provided. Oscillator 62 operates at a frequency which, depending upon whether progression or retrogression of the scanning point is desired, is either slightly higher or slightly lower than the frequency of scanning oscillator 52. In one apparatus built in accordance with this invention in which progression of scanning was employed, the output of the scan oscillator 52 was 100 kilocycles while the output of pulse oscillator 62 was 100.5 kilocycles. In order to maintain the frequency relationship between oscillators 52 and 62, both oscillators are preferably crystal controlled and physically located in the same temperature controlled environment. The output of pulse oscillator 62 is applied to a pulse former 64 which shapes the pulses to give them sharp leading and trailing edges. The shaped pulses from pulse former 64 are, in the embodiment of FIGURE 1, applied to a coincidence detector 66. Coincidence detector 66 may be merely an "and" gate of the type well known in the art. Also applied to coincidence detector 66 is the output of a video amplifier 68 which amplifies the electrical signal corresponding to the transparent and opaque portions of mask 40 as sensed by phototube 48 during the scanning of the pattern.

In operation of the apparatus disclosed in FIGURE 1, the cathode ray tube 42 is normally biased on thereby producing a flying spot which continuously and repeatedly scans the pattern mask 40. Video amplifier 68 will provide an output signal whenever a transparent portion of mask 40 is scanned by the flying spot. The output of amplifier 68 will be of sufficient magnitude, if passed by coincidence detector 66, to cause removal of the blocking bias voltage from the control electrode 36 of electron beam machine 10. However, coincidence detector 66 will pass the output from video amplifier 68 only when the scanning of such a transparent indicia on the pattern coincides with the generation of a pulse by oscillator 62. Due to the slight frequency difference between pulse oscillator 62 and scanning control oscillator 52, coincidence detector 66 will be enabled or primed to pass the output of video amplifier 68 at a slightly different point during each successive scan of the pattern to be reproduced. The relation of the pulse frequency to the scanning frequency determines the rate of drift of this point of coincidence. When there is coincidence between generation of a pulse by oscillator 62 and the scanning of indicia on pattern 40, detector 66 will pass the output of amplifier 68 to amplifier 70 wherein it is amplified and then applied to bias control 20. In the manner explained in the above-mentioned Hansen Patent No. 3,177,434, bias control 20, will, upon receipt of an input from amplifier 70, remove the blocking bias voltage from control electrode 36 thus permitting the electron beam to impinge on workpiece 12. Due to the locking together or simultaneous scanning of the deflection voltages in cathode ray tube 42 and electron beam machine 10, the gated electron beam will strike workpiece 12 at the desired points as determined by pattern 40. However, due to the drift of the coincidence point, the beam will not impinge on adjacent surface areas successively in time. That is, progression or retrogression of the point of coincidence results in the electron beam being gated on at a different time during each successive cycle of the $x$ deflection voltage.

Referring now to FIGURE 2, a second embodiment of this invention is disclosed. In the embodiment of FIGURE 2, coincidence detector 66 has been eliminated and cathode ray tube 42 is modulated by the output of the pulse oscillator 62. Modulation of the cathode ray tube results in each line of the scan being broken into dots or dashes depending upon the pulse width. The video resulting at the phototube is thus a result of the combined presence of light at the cathode ray tube face and the presence of indicia or a transparent area on the scanned pattern. Upon successive complete scans, the entire pattern mask 40 will be scanned due to the drift of the dot or dash pattern, the drift speed being determined by the relationship between the frequency of pulse oscillator 62 and scan oscillator 52. Otherwise the embodiment of FIGURE 2 operates in the same manner as the embodiment of FIGURE 1 to provide for continuous progression or retrogression of the sampling point of the pattern being scanned.

While a preferred embodiment has been shown and described, various modifications and substitutions may be made without deviating from the spirit and scope of this invention. For example, scan generators 54 and 60 would, in the usual situation, consist of separate saw-tooth generators for the cathode ray tube and the electron beam machine. These saw-tooth generators, which might be located in remote locations, would be synchronized by the output of the scan oscillator which could be applied to either one or both over telephone lines or microwave relays. Also, while this invention has been discussed in connection with controlling the scanning of a working beam of charged particles, it would also be applicable to the controlling of the scanning and energizing of any device, such as a laser, which utilizes a beam of energy to work a material. In the case of a laser the output of the x and y scan generators would be applied to means to deflect a beam of light such as the ultrasonic cell arrangement disclosed in FIGURE 6 of copending application Serial No. 228,969, filed by A. J. De Maria on October 8, 1962, and assigned to the same assignee as the present invention or to a mechanical lens arrangement. Thus, this invention is described by way of illustration rather than limitation and accordingly it is understood that this invention is to be limited only by the appended claims taken in view of the prior art.

I claim:

1. Apparatus for causing an energized beam to reproduce a pattern comprising:
    means for generating an energized beam,
    means for gating said beam,
    means for deflecting said beam when gated on,
    means carrying indicia which comprise the pattern to be reproduced,
    means for scanning said pattern,
    means coupled to said pattern scanning and beam deflecting means for causing synchronized scanning of the pattern and deflection of the beam in a first direction at a first frequency,
    means coupled to said pattern scanning and beam deflecting means for causing synchronized scanning of the pattern and deflection of the beam in a second direction at a secod frequency,
    means for generating signals at a third frequency differing from said first scanning frequency by a preselected drift frequency,
    means responsive to the simultaneous scanning of indicia on the pattern and the generation of one of said third frequency signals for generating a control signal, and
    means for applying said control signal to said beam gating means to thereby cause said beam to be gated on.

2. Apparatus for causing an energized beam to reproduce a pattern comprising:
    means for generating an energized beam,
    means for gating said beam,
    means for deflecting said beam when gated on in a first direction,
    means for deflecting said beam when gated on in a second direction,
    means carrying indicia which comprise the pattern to be reproduced,
    means for scanning said pattern in two directions,
    first signal generator means coupled to said pattern scanning means and to said means for deflecting the beam in a first direction for causing synchronized scanning of the pattern and deflection of the beam in a first direction at a first frequency,
    second signal generator means coupled to said pattern scanning means and to said means for deflecting the beam in a second direction for causing synchronized scanning of the pattern and deflection of the beam in a second direction at a second frequency,
    means for generating pulses at a third frequency differing from said first scanning frequency by a preselected drift frequency,
    means responsive to the scanning of indicia on the pattern for generating pattern occurrence signals,
    means responsive to said third frequency pulses and pattern occurrence signals for generating a control signal upon the coincidence thereof, and
    means applying said control signals to said beam gating means to thereby cause said beam to be gated on.

3. The apparatus of claim 2 wherein said pattern scanning means comprises:
    means positioned adjacent the indicia carrying means for generating a beam of electromagnetic energy,
    means for focusing said beam of electromagnetic energy at the indicia carrying means, and
    means for causing said beam of electromagnetic energy to scan said indicia carrying means in two directions.

4. Apparatus for causing an energized beam to reproduce a pattern comprising:
    means for generating an energized beam,
    means for gating said beam,
    means for deflecting said beam when gated on in a first direction,
    means for deflecting said beam when gated on in a second direction,
    means carrying indicia which comprise the pattern to be reproduced,
    means for scanning said pattern in two directions,
    first signal generator means coupled to said pattern scanning means and to said means for deflecting the beam in a first direction for causing synchronized scanning of the pattern and deflection of the beam in a first direction at a first frequency,
    means coupled to said pattern scanning means and to said means for deflecting the beam in a second direction for causing synchronized scanning of the pattern and deflection of the beam in a second direction at a second frequency,
    means for generating pulses at a third frequency differing from said first scanning frequency by a preselected drift frequency,
    means applying said third frequency pulses to said pattern scanning means for gating said pattern scanning means,
    means responsive to the scanning of indicia on the pattern for generating control signals indicative of the gating on of said scanning means simultaneous with the scanning of indicia on the pattern, and
    means applying said control signal to said beam gating means to thereby cause said beam to be gated on.

5. Apparatus for programming the working of material with an intense beam of charged particles comprising:
    a flying spot scanner,
    a pattern mask containing beam deflection information positioned relative to said scanner so as to permit scanning of the pattern by the point source of light emanating from said scanner, means for gating said intense beam of charged particles, means for deflecting said intense beam of charged particles in a first direction, means for deflecting said intense beam of charged particles in a second direction, means coupled to said flying spot scanner and means for deflecting said beam in a first direction for causing synchronized deflection of the flying spot and beam in a first direction at a first frequency, means coupled to said flying spot scanner and means for deflecting said beam in a second direction for causing synchronized deflection of the flying spot and beam in the second direction at a second frequency, means for generating pulses at a third frequency differing from said first scanning frequency by a preselected drift frequency, light sensitive means responsive to the scanning of indicia on the pattern by the flying spot scanner for generating pattern occurrence signals, means responsive to said third frequency pulses and pattern occurrence signals for generating beam control signals upon the coincidence thereof, and means applying said control signals to said beam gating means to thereby cause said beam to be gated on.

References Cited by the Examiner

UNITED STATES PATENTS 3,192,318  6/1965  Schleich et al. _____ 178—6.8

RALPH G. NILSON, *Primary Examiner.*

A. L. BIRCH, *Assistant Examiner.*